July 14, 1936.   H. B. SIEMS   2,047,393
FERTILIZER PREPARATION
Original Filed March 28, 1932
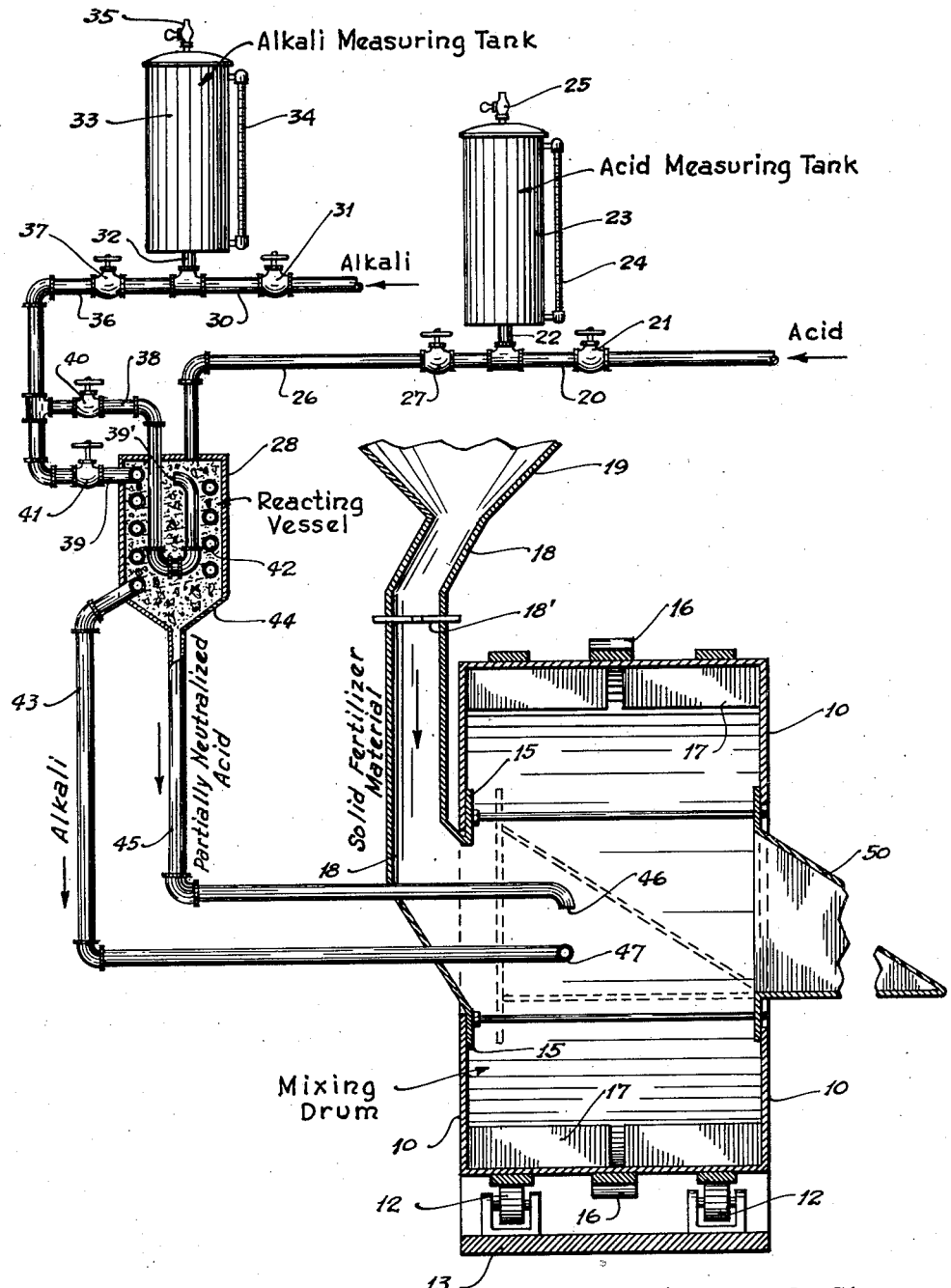
Herman B. Siems
INVENTOR Patented July 14, 1936

2,047,393

UNITED STATES PATENT OFFICE 2,047,393

FERTILIZER PREPARATION

Herman B. Siems, Chicago, Ill., assignor to Swift and Company Fertilizer Works, Chicago, Ill., a corporation of Delaware Original application March 28, 1932, Serial No. 601,579. Divided and this application January 10, 1934, Serial No. 706,088

7 Claims. (Cl. 71—9)

This invention relates to a method of preparing fertilizers and is a division of my application entitled Acid treatment of solids, Serial No. 601,579, filed March 28, 1932, in response to which Patent No. 1,989,175 was granted January 29, 1935.

This invention has a high degree of utility when used in connection with certain types of mixing operations wherein the salt produced by the inter-action of an alkali and an acid is formed in a mixing chamber containing solids composed of granular particles of relatively large diameter and smaller particles of graduated size down to the size of fine powders. Such mixing is frequently employed in the production of fertilizers wherein in accordance with this invention, an alkaline reacting liquid or gas, or both, may be injected simultaneously with the injection of a suitable acid, into the mixing chamber containing the other ingredients of the fertilizer in such manner as to provide a spray of the reagents. The salt resulting from the interaction of the acid and alkali spray is thus formed and directly mixed with the other constituents.

By way of example, the invention is herein illustrated and described as embodied in a process and apparatus for the production of fertilizer and in this illustration the fertilizer mixture may comprise such materials as super-phosphate, sulphate of ammonia, nitrate of soda, tankage, potash salts, treble super-phosphate, etc. The salt produced by the acid and alkali spray is that resulting from the inter-action of acids such as sulphuric or phosphoric with anhydrous ammonia, aqueous ammonia, or any other reagents productive of the particular salts desired.

A further and important object of this invention as applied to mixing operations and particularly of the type involved in the production of fertilizers is that of producing a salt in the mixing chamber by commingling the sprayed reagents whereby as a result, the finer or powdered particles of the solid materials are caused to adhere to or coat the larger particles, or many small particles are caused to be cemented together, thereby resulting in a final mixture in which all of the particles are more nearly of the same size and physical appearance.

As an instant to the above stated object a simultaneous introduction of the acid and alkaline reacting substances into the mixing vessel offers a highly convenient and desirable method of forming the desired salt from suitable acids and alkalis. In the production of fertilizer in accordance with this invention, the resultant product when discharged from the mixer, is of a much higher temperature than is the case with ordinary fertilizer mixtures which is due to the heat liberated by the exothermic neutralizing action of the acid and alkali. Furthermore, the resultant product possesses a much superior chemical form and condition as compared with fertilizers made in the usual manner.

The apparatus used in carrying out the present invention is described in my heretofore mentioned application entitled Acid treatment of solids, Serial No. 601,579, and is described and claimed in my copending application Serial No. 706,089, filed January 10, 1934, which is also a division of my heretofore mentioned application entitled Acid treatment of solids, Serial No. 601,579. However, in order that the present invention might be clearly understood I will, by reference to the drawing, describe the apparatus depicted therein which is a preferred form of apparatus for carrying out the present invention.

The single figure of the drawing is a somewhat diagrammatic elevational view of an apparatus constructed in accordance with this invention and designed particularly for the production of fertilizer. It is believed that the legends on the drawing clearly bring out the manner of utilizing the apparatus.

By referring to the drawing it will be noted that the disclosure includes a mixing drum 10, which may be of any suitable size and construction for use in mixing solid materials such as those commonly employed in fertilizer mixtures. As here illustrated, the drum is of the rotary type mounted on suitable roller bearings 12, carried by the support 13, and the drum may be driven from any suitable source of power (not shown) by means of a pinion in mesh with a ring gear 16, attached to the drum.

The drum is preferably provided with a number of blades 17 on the interior thereof to assist in the mixing operation. The solid material may be fed to the drum through a pipe 18 from any suitable source of supply such as a hopper 19.

Pipe 18 is connected to a non-rotatable part 15, so that the material may be fed to the drum while the drum is rotating. Pipes 43 and 45 may be extended into the central part of the drum substantially as shown in the drawing. Opposite the stationary part 15, and centrally of the drum, a discharge device 50 may be provided having an inclined upper surface. This apparatus is likewise stationarily mounted and while the drum is rotating, is maintained in the full line position shown in the drawing but is adapted to be moved inwardly to the dotted line position for effecting a discharge of the mixture. The material pipe 18 is preferably provided with a valve 18' to prevent the escape of gases before the neutralizing action has been completed.

It is obvious that the neutralizing process and apparatus here referred to may be used in connection with any suitable operation and that the particular construction of the drum here shown is merely for the purpose of illustrating the invention as applied in the manufacture of the fertilizer.

The apparatus for providing the salt above referred to will now be described. The pipe 20 having a valve 21 is connected to a source of mineral acid such as sulphuric or phosphoric acids and also by means of pipe 22 to the bottom of the measuring tank 23. The measuring tank is provided with a graduated sight gauge 24, so that by operation of the valve 21, any measured quantity of acid may be introduced into the tank. In feeding the acid to the tank, and during the discharge thereof, the tank is vented to the atmosphere by means of a petcock 25. After securing the desired amount of acid, valve 21 is closed and the acid may thereafter be discharged through pipe 26, having a valve 27 therein which may be open so that the acid will be fed directly into the reacting vessel 28. In the drawing, the vessel is shown in cross section whereby to disclose the interior construction thereof.

In addition, a pipe 30 is provided having a shut-off valve 31 which pipe connects at one end to a suitable source of alkaline reacting substance such as anhydrous ammonia, aqueous ammonia, or any other desired alkali, and at its other end, through pipe 32, to a measuring tank 33, of substantially the construction of the tank 23. This tank also has a sight gauge 34, and an air vent petcock 35. Leading from the pipe 32, is the pipe 36 having a shut off valve 37. This pipe branches to form pipes 38 and 39. Pipe 38 passes downwardly into the mixing vessel 28 and thence upwardly and terminates as at 39' whereby to serve as a discharge for the alkaline substance in the reacting vessel. Pipe 38 is provided with a control valve 40 and a pipe 39 with a control valve 41, so that the exact amount of alkali passing through each pipe may be readily adjusted. It will be further noted that pipe 39 likewise passes into the reacting vessel but instead of opening to the interior thereof, passes therethrough in the form of a coil 42 and thence outwardly and downwardly by means of pipe 43. The bottom of the mixing vessel has inclined walls as at 44 which terminate in a downwardly extending discharge pipe 45. Discharge pipe 45 passes through the walls of the casing 15 of the mixing drum substantially as shown in the drawing and terminates in a discharge nozzle 46. This nozzle is shown as discharging downwardly. Likewise the pipe 43 passes through the walls of the casing 15 and terminates in a discharge nozzle 47 which is arranged in close proximity to the nozzle 46 but preferably at right angles thereto.

In operation, the desired reaction between the acid and the ammonia or other alkali is brought about in the following manner. After the desired measured quantity of acid and alkali have been collected in tanks 23 and 33 respectively, valves 40 and 41 are adjusted to control the quantity of alkali fed through the two branch pipes 38 and 39. Thereafter valves 27 and 37 are opened whereby the acid is permitted to pass into the reacting vessel 28 and the alkali is permitted to pass into the branch pipes 38 and 39.

The portion of the alkali which by way of illustration may be anhydrous ammonia, passing into pipe 38, discharges into the reaction vessel to cause a neutralizing reaction with the acid. The reacting vessel is preferably charged with a suitable filling material such as coke or other similar material which will not be attacked by the acid but will cause the acid to expose considerable surface as it trickles over the particles thereof.

Thus in the reacting vessel, the acid enters and is distributed with a large surface exposure throughout the coke mass in the vessel whereby it is brought in reacting contact with the ammonia or other alkali discharging from the outlet 39' of the pipe. This neutralizing reaction is exothermic and accordingly, a considerable amount of heat is liberated in the reacting vessel. The amount of ammonia introduced through valve 40 is regulated in such manner that the ammonia does not completely neutralize the mineral acid whereby no solid phase separates out at the temperature attained in the reaction vessel. Thereafter, the acid in the reacting vessel which has been partially neutralized and the temperature of which has been elevated considerably, is then discharged downwardly through pipe 45 and out through the nozzle 46.

The ammonia fed through pipe 39 passes through the coil 42 in the reacting vessel and thence through pipe 43 to the discharge nozzle 47. By passing the ammonia through the coil 42, heat of neutralization is imparted to the ammonia which not only raises its temperature but causes a larger volume thereof to exist in the gaseous phase. The heat likewise raises the temperature of the partially neutralized acid whereby freezing of the acid during the atomizing action is avoided.

The mixture of acid and dissolved salt which is delivered at 46 is met by a mixture of gaseous and/or liquid ammonia issuing from the nozzle 47. By virtue of the fact that the nozzles are arranged to discharge in different directions and the ammonia gas and/or liquid held under pressure is caused to discharge from the nozzle 47 with considerable velocity, the gaseous and liquid ammonia mixes with the hot acid and dissolved salt issued from the nozzle 46 in such a manner as to produce a fine spray.

This spray establishes a commingling of the reagents within the region of the mixing chamber whereby the desired salt is produced in the manner above described. In addition, the powdered particles of solid material are caused to be cemented together to form larger particles so that a fertilizer mixture of particles of substantially uniform size and physical condition results.

In the above illustration which relates to the production of fertilizer, the alkali employed is anhydrous ammonia. As it is usual for anhydrous ammonia to be supplied from a container under pressure so that it will normally exist in liquid form, the ammonia injected from nozzle 47 will have considerable velocity and therefore an atomizing effect upon the acid discharged from nozzle 47. It is the discharge of the ammonia in either gaseous or liquid form or a mixture of both, that is productive of the spray of the reagents producing the salt.

In the event the process is used with other alkaline re-agents, it is of course understood that the alkali can be discharged under pressure by any suitable means such as supplied by a pump or a gaseous pressure on the liquid. In such case, the alkali will be caused to discharge with considerable force, and thereby produce the desired atomizing effect with the acid.

With anhydrous ammonia, the heat of neutralization developed in the reacting vessel serves to pre-heat both the acid and the ammonia whereby to avoid the danger of the ammonia freezing the acid and clogging the nozzle 46 and otherwise interfering with the process. This precaution is exercised because the refrigerating effect of the discharge ammonia may, in some instances, prevent the successful neutralizing action by freezing the sub-divided particles of acid and thereby clogging the nozzle and preventing neutralization.

Anhydrous ammonia which is kept in tanks, exists to a large extent in liquid form and the pre-heating in the coil 42 also serves to assure the existence of a substantial amount of the ammonia in the gaseous phase after passing valve 41, so as to produce the maximum atomizing effect. With ammonia and acid such as sulphuric or phosphoric acids above referred to, in addition to the mechanical atomizing effect of the discharging gas, the action is enhanced by what may be considered the explosive effect of the rapid formation of steam resulting from the neutralizing reaction as expanded by the heat of neutralization. This causes drops of acid to explode and to become atomized and therefore more uniformly distributed.

It is to be understood that the invention is not to be limited by the disclosure herein given which is merely by way of illustration as the scope of the invention may be determined from the appended claims.

I claim:

1. The process of producing fertilizer which comprises feeding partially neutralized acid into a reaction space containing solid ingredients of fertilizer in subdivided form ranging from granular particles down to particles of fine powder, causing anhydrous ammonia to forcefully discharge into the path of the partially neutralized acid and to form an atomized spray therewith, whereby said partially neutralized acid and said anhydrous ammonia commingle and form a solid salt and causing the solid salt to be mixed with the solid ingredients of fertilizer to exert a cementing effect on the smaller particles.

2. The process of producing fertilizer which comprises feeding partially neutralized acid into a reaction space containing solid ingredients of fertilizer in subdivided form ranging from granular particles down to particles of fine powder, causing alkali to forcefully discharge into the path of the partially neutralized acid and to form an atomized spray therewith, whereby said partially neutralized acid and said alkali commingle and form a solid salt and causing the solid salt to be mixed with the solid ingredients of fertilizer to exert a cementing effect on the smaller particles.

3. The process of producing fertilizer which comprises feeding partially neutralized acid into a reaction space containing solid ingredients of fertilizer selected from the class consisting of super-phosphate, sulphate of ammonia, nitrate of soda, tankage, potash salts and treble phosphate while existing in subdivided form ranging from granular particles down to particles of fine powder, causing anhydrous ammonia to forcefully discharge into the path of the partially neutralized acid and to form an atomized spray therewith, whereby said partially neutralized acid and said anhydrous ammonia commingle and form a solid salt and causing the solid salt to be mixed with the solid ingredients of fertilizer to exert a cementing effect on the smaller particles.

4. The process of producing fertilizer which comprises partially neutralizing an acid by the addition of anhydrous ammonia, producing a salt by spraying the partially neutralized acid in the path of preheated anhydrous ammonia in atmospheric suspension in a chamber, simultaneously introducing solids in finely divided form in close association with the salt formed by the interaction of the partially neutralized acid and anhydrous ammonia to cause adherence of the salt to the solids, collecting the solids and salt and mixing.

5. The process of producing fertilizer which comprises partially neutralizing an acid by the addition of anhydrous ammonia, producing a salt by spraying the partially neutralized acid in the path of preheated anhydrous ammonia in atmospheric suspension in a chamber, simultaneously introducing solids in finely divided form in close association with the salt formed by the interaction of the partially neutralized acid and anhydrous ammonia to cause adherence of the salt to the solids and collecting the solids and salt.

6. The process of producing fertilizer which comprises partially neutralizing an acid by the addition of alkali, producing a salt by spraying the partially neutralized acid in the path of preheated alkali in atmospheric suspension in a chamber, simultaneously introducing solids in finely divided form in close association with the salt formed by the interaction of the partially neutralized acid and alkali to cause adherence of the salt to the solids, collecting the solids and salt and mixing.

7. The process of producing fertilizer which comprises partially neutralizing an acid by the addition of alkali, producing a salt by spraying the partially neutralized acid in the path of preheated alkali in atmospheric suspension in a chamber, simultaneously introducing solids in finely divided form in close association with the salt formed by the interaction of the partially neutralized acid and alkali to cause adherence of the salt to the solids and collecting the solids and salt.

HERMAN B. SIEMS.